(12) United States Patent
Faris et al.

(10) Patent No.: US 8,293,339 B2
(45) Date of Patent: Oct. 23, 2012

(54) DROPLET BILAYERS

(75) Inventors: Gregory W. Faris, Menlo Park, CA (US); Sanhita Dixit, Fremont, CA (US)

(73) Assignee: SRI International, Inc., Menlo Park, CA (US)

( * ) Notice: Subject to any disclaimer, the term of this patent is extended or adjusted under 35 U.S.C. 154(b) by 824 days.

(21) Appl. No.: 12/212,643

(22) Filed: Sep. 17, 2008

(65) Prior Publication Data

US 2009/0074988 A1 Mar. 19, 2009

Related U.S. Application Data

(60) Provisional application No. 60/973,022, filed on Sep. 17, 2007.

(51) Int. Cl.
*B05D 3/00* (2006.01)
(52) U.S. Cl. ........................................ 427/554; 427/555
(58) Field of Classification Search .................. 427/555, 427/554
See application file for complete search history.

(56) References Cited

FOREIGN PATENT DOCUMENTS

WO  WO 2005069964 A2 *  8/2005

OTHER PUBLICATIONS

Holden et al. "Functional Bionetworks from Nanoliter Water Droplets" J. Am. Chem. Soc. 2007, 129, 8650-8655, Available online Jun. 16, 2007.*

\* cited by examiner

*Primary Examiner* — Robert S Walters, Jr.
(74) *Attorney, Agent, or Firm* — Richard Aron Osman

(57) ABSTRACT

The invention provides methods and apparatuses for making an artificial, amphiphilic bilayer using aqueous micro-droplets (1-1,000 um dia) in a water-immiscible solvent, wherein immediately surrounding each droplet is a monolayer of amphiphilic molecules; the general method comprising: juxtapositioning the droplets with a focused laser beam such that the monolayers merge to create a bilayer of the amphiphilic molecules between the droplets.

20 Claims, 9 Drawing Sheets

DROPLET BILAYERS

This application claims priority to U.S. Ser. No. 60/973,022, filed Sep. 17, 2007 by the same inventors.

FIELD OF THE INVENTION

The field of the invention is artificial lipid bilayers.

BACKGROUND OF THE INVENTION

Membrane proteins and peptides are extremely important to understanding human health and treating disease. Membrane proteins make up 30% of all proteins in the body,[7] are involved in regulating signal transduction and molecular transport into and between cells, and are the target of most drugs available today.[8] To function properly, membrane proteins must be embedded in a lipid bilayer. Well-controlled studies of individual membrane proteins or peptides require creating an artificial lipid membrane to hold the protein or peptide, but existing methods for producing artificial membranes, such as the black lipid membrane and membranes with solid support, cannot be adapted to high-throughput techniques because the membranes are quite delicate as in the case of black lipid membranes or have limited access to one of the two sides of the bilayer for membranes riding on a solid support. High-throughput methods, which allow examination of a large number of compounds or a large number of interactions simultaneously, are increasingly being used to study molecular interactions affecting human health and to identify and test drugs. The importance of high-throughput screening has been recognized in the NIH Roadmap for Medical Research. The Molecular Libraries and Imaging portion of the NIH Roadmap seeks to facilitate the development of new, small-molecule drugs within the public sector. High-throughput screening of these small molecules is an integral part of the proposed effort.

We have developed and disclose a method for studying lipid membranes and membrane proteins or peptides based on an inverted emulsion manipulated by a laser. With this method we can readily produce bilayer membranes with small volumes and small surface areas. This method is easily adapted to high-throughput screening of membrane protein function and drugs influencing membrane proteins or peptides. Because of the small size of the membrane, this technique avoids the membrane fragility issues typical of black lipid membrane techniques, and because the membrane is formed between two inverted emulsion droplets, we avoid the difficulties in accessing both sides of the membrane found with artificial membranes on solid supports. With the small volumes involved, we can minimize the quantities of reagent used in assays and can perform very large numbers of assays rapidly on a single substrate. The combined optical manipulation and readout make for a relatively simple yet quite flexible assay platform. Some of our results on introduction of lipid vesicles in the aqueous phase of the emulsion has also been demonstrated in a publication by the Bayley group.[9]

SUMMARY OF THE INVENTION

The invention provides methods and apparatuses for making an amphiphilic bilayer using aqueous micro-droplets (1-1,000 um dia) in a water-immiscible solvent, wherein immediately surrounding each droplet is a monolayer of amphiphiles; the general method comprising: juxtapositioning the droplets with a focused laser beam such that the monolayers merge to create a bilayer of the amphiphiles between the droplets.

The invention encompasses alternative combinations of particular embodiments: wherein the droplets are restrained in two dimensions by one or more solid surfaces or density-differential interfaces; wherein the laser beam juxtaposes the droplets by localized heating (Marangoni effect or convection) or by refractive index mismatch; wherein the solvent is mineral oil, hexadecane, squalene, decane, dodecane, or decanol; wherein the amphiphilic molecules are phospholipids, surfactants, or physiological lipids; wherein the droplets are arrayed on a surface such as polystyrene, other plastic surface, fluorinated oil, or a silanized surface; and further comprising the antecedent step of arraying the droplets on a surface by contact printing, ink-jet type printing or microextrusion.

DETAILED DESCRIPTION OF SPECIFIC EMBODIMENTS OF THE INVENTION

Figure 1:
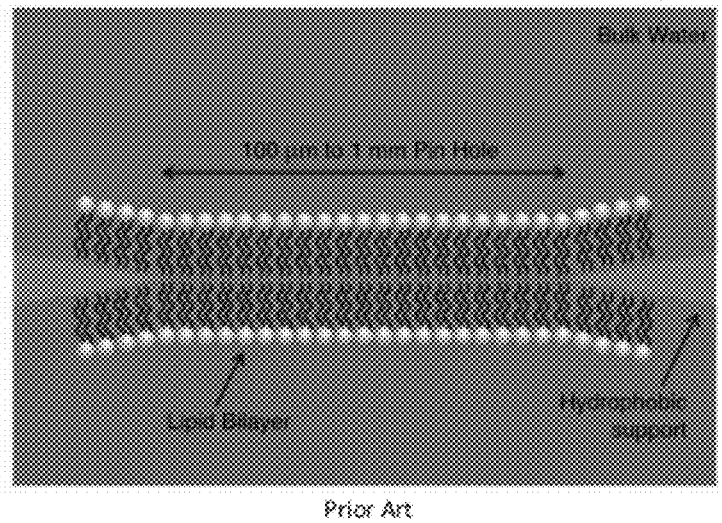
FIG. 1. Diagram of black lipid membrane. A hydrophobic support creates an aperture separating two aqueous reservoirs (from Ref[18]).

Membrane Proteins and Peptides. Proteins residing in a cell membrane play a crucial role in the survival of the cell. They enable communication between cells, transport matter into and out of the cells, connect cells to the extracellular matrix, and function as receptors for viruses. Interest in membrane proteins is not limited to biophysical study alone, but remains a key focus in the biotechnology industry for drug development.[10] Most drugs available in the market today target membrane proteins. A majority of membrane proteins are transmembrane proteins, which span the entire length of the lipid bilayer and have domains extruding into the cytosol as well as the extracellular matrix. Ion channels are a typical example of transmembrane proteins. Their structure allows them to adopt active conformations in their native environment, i.e., the cell membrane, but they cannot be easily studied in the solution state, primarily because of hydrophobic domains in the proteins that require insertion in the hydrophobic core present in cell membranes. Consequently, significant effort has been directed at developing artificial lipid bilayer systems that mimic cell membranes and host transmembrane proteins.

Ion channels are a particular class of membrane proteins that form pores in the cell membrane and transport various types of ions such as Na+, K+, Ca2+ and Cl− between the cytoplasm and the extracellular environment. Ion concentration gradients exist between the cytoplasm and the extracellular matrix, and ion channels allow for their rapid transport. Neuronal signal transduction, muscle contraction, and cell transcription are a few of the many instances in which ion channels play a crucial role in efficient cellular function. Mutations that alter the functioning of channel proteins have been implicated in several diseases such as diabetes, cardiac arrhythmia, and several neuronal disorders, to name a few, and are collectively referred to as channelopathies.[6,11-13] Often, channel-forming peptides have been implicated in certain neurodegenerative illnesses such as Alzheimer's disease. Current research is aimed at elucidating the role of these peptides in inducing cytotoxicity by altering the Ca2+ ion concentration within the cell.[4,14] Specifically, amyloid beta peptides are thought to aggregate in the cell membrane and form pores that are able to conduct Ca2+ ions from extracellular regions into the cell. Given their importance, a substantial effort has been devoted to the development of new screening technologies to detect ion channels.

Patch-clamp technologies are considered as the "gold standard" in the measurement of ion channel activity and pharmacology. In their traditional configuration, these time-consuming, low-throughput methodologies require operator skill and access to the interior of the cell. While automated patch clamp techniques are now commercially available,[10,15] the high cost of consumables impacts their routine use. Furthermore, since whole cells are used in these techniques, it is difficult to study the behavior of isolated single ion channels or peptide assemblies and the effect of possible drug candidates on their biophysical function. The ability to study ion channels and other transmembrane proteins individually and in-vitro, embedded in artificial bilayers, would help isolate protein responses to drugs independent of other proteins present in whole-cell patch-clamp assays.

Artificial Cell Membranes. A prerequisite for studying transmembrane proteins is the development of artificial cell membranes capable of incorporating those proteins. There are three primary methods for production of artificial cell membranes: black lipid membranes (BLMs), lipid vesicles, and lipid bilayers riding on a solid support. These methods generally rely on a physical property of lipid molecules, i.e., self-assembly. When lipids dissolved in an organic solvent are exposed to water, they migrate to the water-organic solvent interface to form an interfacial film, a lipid monolayer. When two such interfaces are brought into contact, they form a lipid bilayer. Certain lipid molecules spontaneously self-assemble in water to form vesicles with an aqueous interior, but it is difficult to control the contents of this internal aqueous chamber. A different self-assembly route is followed when BLMs are created at the organic solvent-water interface. In this method, shown in FIG. 1, the organic solvent is painted on an aperture separating two aqueous reservoirs. The lipid molecules self-assemble to form a bilayer, and the organic solvent thins out of the interface. BLMs are extremely fragile and difficult to reproduce in a controlled manner. Recent advances in microfluidic circuitry have allowed access to BLMs, and several novel devices[16] have been demonstrated.

Figure 2:
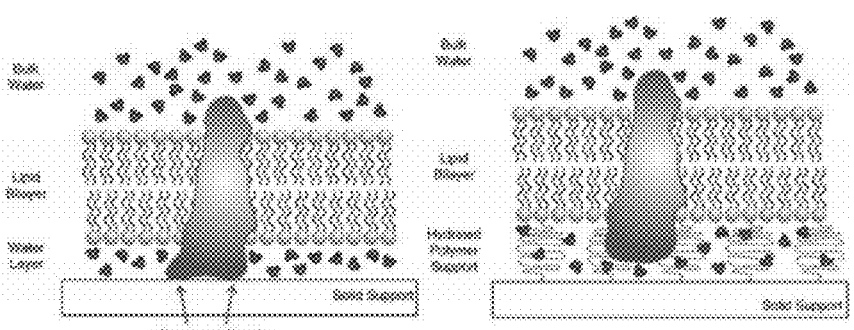
FIG. 2. Supported lipid bilayers (from Ref[18]).

Solid support based methods create a membrane directly on a variety of substrates such as glass, gold, hydrogels and other porous materials.[17,18] Although solid support methods have received much attention, there exists a basic drawback in using substrate-supported membrane arrays to study transmembrane proteins. Unless the supported bilayer is lifted off the substrate surface, proteins that span the membrane with intracellular domains will not be incorporated into the bilayer. More recently, supported bilayers have been fabricated on surfaces with polymer cushions (FIG. 2). Even so, none of these biomimetic systems have resulted in devices that can easily be used to study ion channels and related applications of transmembrane protein function.

Inverted Emulsion Artificial Membranes. In the past couple of years, another approach based on lipid self-assembly at the water-oil interface has been exploited to form lipid bilayers with water-in-oil emulsions.[3,19-22] Specifically, surface-active agents (surfactants and lipids) self-assemble into molecular monolayers at the oil-water interface. Lipid bilayers are formed when the organic phase is displaced as two water-oil interfaces are brought into proximity. The approaching interfaces each have a lipid monolayer. On contact, the lipid monolayers displace the organic film between them to form stable lipid bilayers. In all these studies, droplet manipulation was initiated either via microfluidic channels[20,22] or using pipettes and micromanipulators fitted with electrodes.[3,19] Electrical measurements were used to detect the presence and function of channel-forming proteins embedded in these lipid bilayers. In contrast, optically driven droplet technologies for transmembrane protein detection in artificial lipid bilayers remain underdeveloped.

While fluidic circuitry is the microscopic equivalent of tubing or pipes, droplet motion is a closer analogy to the individual droplet delivery obtained with pipettes, the current mainstay of the macroscale chemistry and biology laboratory. Droplet-based techniques thus provide an alternative paradigm to current lab-on-a-chip technologies for high-throughput applications in chemistry and biology using small volumes and large numbers of samples. The optically driven droplet methods allow use of the same optical platform (i.e., microscope) for both manipulating the droplets and reading out assay results. Advantages of optically driven droplet-based techniques relevant to artificial membranes include:

- Assays based on individual droplet movement eliminate the requirement of valves and pumps typically found in microfluidic methods.
- Assays may be rapidly reconfigured.
- Random access to substrate sites is easily accomplished.
- No on-chip "real estate" is devoted to electrical circuitry.
- The substrate, generally a disposable, does not require expensive and time-consuming fabrication.
- Reagents may be delivered in exactly the quantity desired without dead channel volume.
- A wide variety of fluorescent reporters are available to monitor changes in parameters such as pH, ion concentrations, and molecular conformations.

Figure 3A:
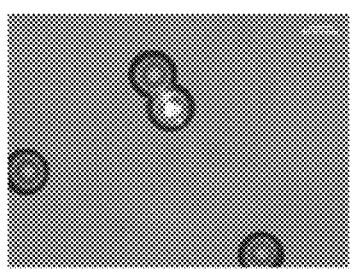
FIG. 3a. Interfacial film formed with sodium dodecyl sulfate (SDS) molecules as surfactants from our data. The bright spot in the image is the location of the laser. The SDS concentration is 0.34 mM. Scale bar is 80 µm. The contact angle formed by the droplets is approximately 57°.
Figure 3B:
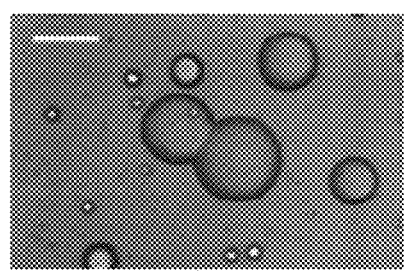
FIG. 3b. Microscope picture of two adhesive droplets stabilized by Egg PC in a mixture of silicone oil (70% by weight) and ether. The contact angle formed by the droplets is about 40° (white bar 50 microns) (from Ref. 23).

We disclose a novel optical methodology to create artificial lipid bilayers from water-in-oil emulsions. When lipid molecules are introduced as surface-active agents in inverted emulsions, dispersed either in the oil phase or the water phase, they form a monolayer at the oil-water interface if their concentration exceeds that required to form a monolayer. If these emulsion droplets experience marked long-range attractive forces of the order of kT,[24] the droplets adhere to each other (see FIG. 3a). Droplet adhesion is stabilized against coalescence provided a strong and steep repulsion exists at short ranges.[24] Poulin and Bibette[23] first demonstrated the presence of a phospholipid stabilized interfacial film between two such adhering water droplets (FIG. 3b). We offer an optical alternative to move lipid-coated emulsion droplets into contact with each other to form artificial lipid bilayers. Optical tweezer technology has been applied to address several questions in biophysics, especially in single molecule studies. We have developed the use of inverted emulsions as microscopic reaction chambers for high-throughput assays using either optical tweezers or another optical technique based on the thermal Marangoni effect.[25,26] By adding lipids to the inverted emulsion, these methods readily adapt to the study of artificial membranes.

Figure 6:
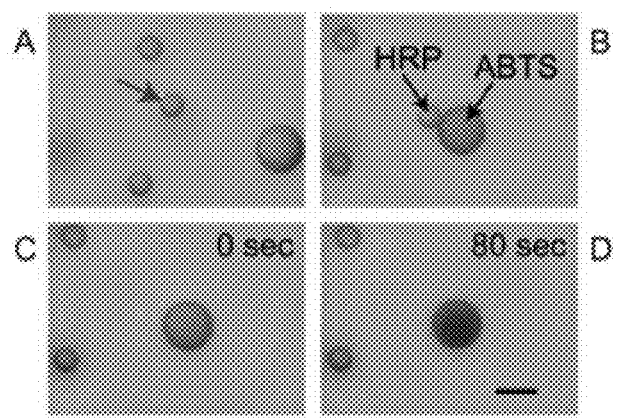
FIG. 6. Images taken during enzyme reaction. The red arrow in A points to the focus of the laser, which is directing a small droplet containing HRP next to a droplet containing substrates ABTS and $H_2O_2$, shown in B. The droplets spontaneously fuse in C, and the oxidation of ABTS is observed as a dark green color change in D. The scale bar in D corresponds to 250 µm. We extrapolate a detection limit for this assay to zeptomoles of enzyme.[26]

Rationale and Advantages. Advantages that are unique to our method include the following:

(1) Production of robust bilayers with the ability to independently access each side of the bilayer, including added reagents (see demonstration of aliquot addition in FIG. 9), allowing optical monitoring of each side at high sensitivity (small volume detection advantage, see FIG. 6). By comparison, BLMs are quite fragile, solid support methods do not allow ready access to both sides of the bilayer, and lipid vesicle methods do not allow simple introduction of reagents to the interior of the vesicle and cannot be created through droplet-on-demand methods.

(2) Ability to produce asymmetric bilayers. We have demonstrated the ability to introduce the lipid in vesicles inside the droplet. With this method, each droplet can be covered by a different dispensed lipid monolayer. Bringing together droplets with dissimilar lipid monolayers will produce asymmetric bilayers.

(3) Ability to perform rapid time-resolved studies, e.g., stimulated by addition of drugs, proteins, or interferents on either side of the membrane as will be investigated in Aim 2. The ability to add reagents to either side of the lipid bilayer and the rapid diffusion due to the small volume on each side of the bilayer creates a unique capability to perform rapid dynamic studies of transport across the bilayer.

Figure 20:
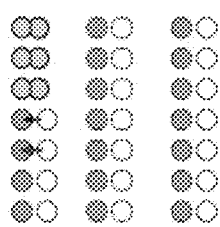
FIG. 20. Schematic of high-throughput artificial emulsion assay.

(4) Easy scaling to high-throughput assays (see schematic in FIG. 20). With on-demand droplet generation, large arrays of lipid-coated droplet pairs can be produced easily. Using a laser to move one droplet in the pair into contact with the other produces a bilayer through all-optical control and readout.

(5) Ability to perform kinetic studies on single channels.

Figure 4:
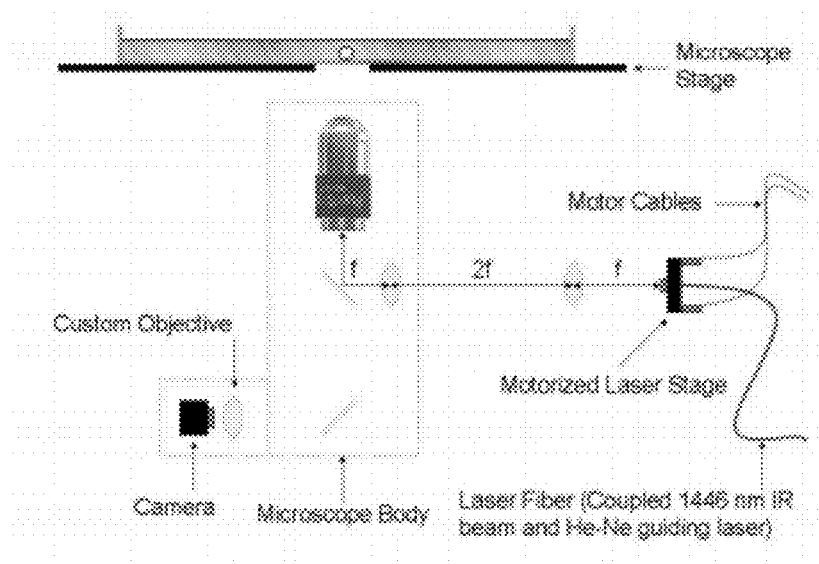
FIG. 4. Schematic layout of the optical apparatus used to move aqueous droplets.
Figure 5:
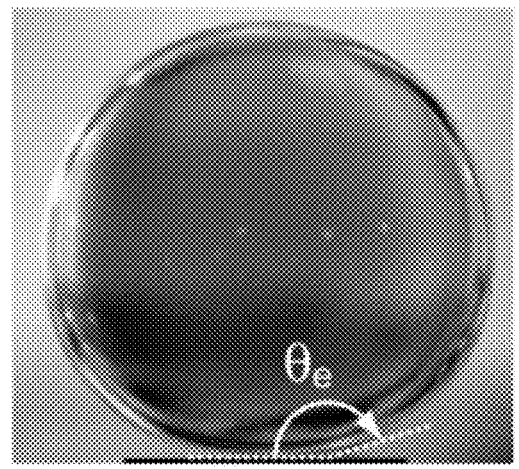
FIG. 5. Profile of water droplet immersed in decanol and resting on polystyrene Petri dish, with equilibrium contact angle $\theta_e$.

Optically Driven Droplet Manipulation. We have developed the manipulation of individual droplets by light using both optical tweezers and the thermal Marangoni effect. An apparatus for these studies is shown in FIG. 4. The system consists of an inverted microscope, which is configured to allow a laser (1446 nm, Fitel) to focus at the edge of a water droplet immersed in a solvent or oil (including decanol, hexadecane, dodecane) in a polystyrene Petri dish. Optical tweezers function by means of radiation pressure applied by a laser. The thermal Marangoni force arises from heating the droplet using a slight absorption of the laser beam at 1446 nm by a vibrational band of water. The resulting thermal gradient gives rise to a surface energy gradient that is sufficient to move droplets away from the laser beam. Using the thermal Marangoni system, we have moved aqueous droplets spanning 5 orders of magnitude in volume (~1.7 mL to 14 pL) at speeds of up to 3 mm/s. When no lipid is present, contact between two droplets leads to spontaneous droplet fusion and very rapid mixing (<33 ms), which is driven by the fusion process.[25] Evaporation becomes a major issue when working with small droplets that possess large surface-area-to-volume ratios. To control evaporation of the small microdroplets of water, we surround them with an immiscible organic solvent. Besides controlling the rate of evaporation, the solvent also increases the contact angle with the solid polystyrene Petri dish on which the droplet rests, as shown in FIG. 5. The increase in the equilibrium contact angle reduces the contact area between the droplet and the Petri dish support, making it easier to move the droplet and minimizing potential interactions between dissolved aqueous molecules and the solid surface. This is important because it minimizes possible surface adsorption of biomolecules in the water droplets onto the solid surface.

Figure 7:
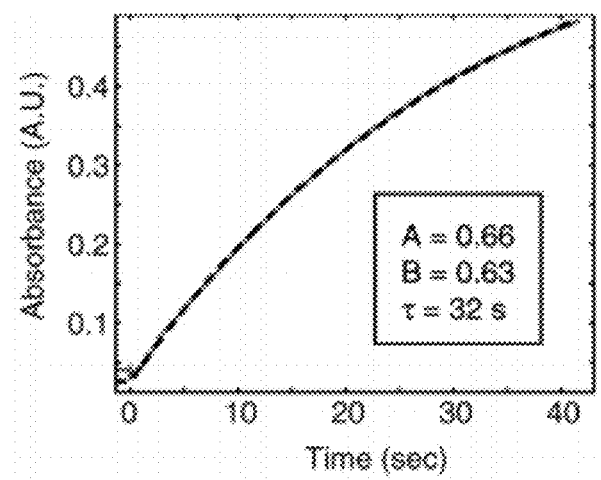
FIG. 7. Sample kinetic trace derived from the video sequence of the HRP droplet assay. The experimental data (red dots) were fit to a single exponential described by the equation $A-B\,e^{-t/\tau}$ (black dashed line). The inset shows the fit parameters.

Droplet-Based Assays. We have adapted the optically driven droplet method to a number of experiments looking at enzyme reaction kinetics.[26] An enzyme's activity is based on its structural configuration, which is sensitive to the chemical environment. We therefore chose to study enzyme kinetics to examine the effects of the interface, chemical partitioning, and heating present in our apparatus. We looked at the oxidation of a chromogenic compound, 2,2'-azino-bis(3-ethylbenzthiazoline-6-sulfonic acid) diammonium salt (ABTS), by horseradish peroxidase (HRP) in the presence of hydrogen peroxide, a common reaction in protein detection assays. In one implementation we used our droplet manipulation apparatus to selectively move a single droplet containing enzyme molecules in aqueous buffer next to a droplet containing the substrates ABTS and hydrogen peroxide. The droplets coalesced, and the oxidation of the ABTS was monitored over time by observing the change in color of the droplet (see FIG. 6). Optical absorption was monitored to provide a direct indication of the reaction rates of the assay both in bulk reagents and in the droplets. The reaction rate kinetics for a droplet is shown in FIG. 7. The reaction rate matched the rate observed in bulk measurements in an aqueous buffer. This finding confirmed that: (1) the enzyme was not affected by the interfaces; (2) the substrates were not partitioning out of the aqueous phase; and (3) the heating of the droplets was not altering enzyme activity. These experiments are in one sense a worst-case situation because there is no lipid layer. The addition of a lipid layer further isolates the aqueous phase from the oil phase.

Self-Assembled Surfactant And Lipid Layers. We have adapted this optical technique to manipulate water droplets coated with a surfactant or lipid monolayer. The motivation to try this approach was largely driven by literature relating to emulsion systems[27-31] and the recent interest in developing biomimetic lipid membrane systems capable of reconstituting membrane proteins.[32-37] The challenge lies in identifying the oil phase to host the water drops and to choose the appropriate lipid. Poulin and Bibette[23] demonstrated that water drops suspended in an organic solvent could adhere provided there were surfactant monolayers adsorbed at the interface. In their system, a water-in-oil emulsion was formed under slow mixing in the presence of lipid molecules, namely, egg lecithin. The oil medium was a mixture of two liquids, silicone oil and ether. Egg lecithin is soluble in ether, but insoluble in silicone oil. The silicon oil aids in formation of a stable adhered droplets. The authors report the presence of adhesive droplets in this emulsion system and attribute the adhesion to a strong attraction between the facing monolayers, which results in the formation of a bilayer such as observed in lipid vesicles and cell membranes.

Droplet-Based Artificial Bilayers. We have tested the optical method for producing lipid bilayers. Droplets were generated in a Petri dish containing decanol using a 34-gauge syringe needle (Microfil, WPI). Using aqueous solutions of six carbon chain lipid 6:0 PC, the lipid-coated droplets coalesced when brought together optically. Having tested the feasibility of our optical manipulation method, we tried to ascertain whether the presence of a longer lipid in the water phase would give rise to droplet adhesion when two drops are brought into close proximity. Aqueous solutions of 10:0 PG adhered rather than coalesced, forming a lipid bilayer. The bilayer was stable for long periods; 20 minutes and more— ample time to perform bilayer assays.

Figure 8:
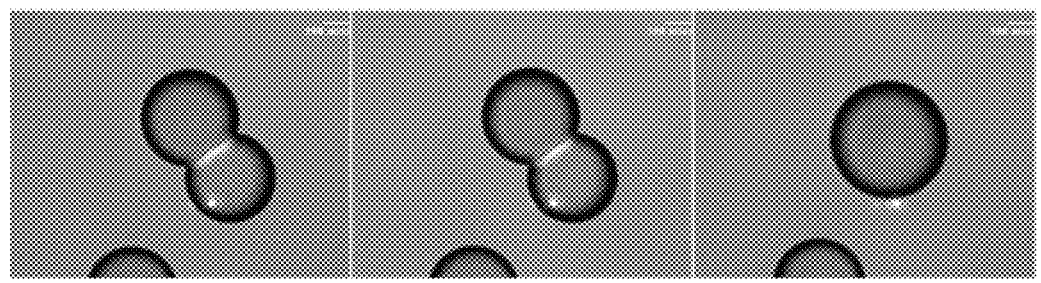
FIG. 8. Sequential images showing droplet coalescence from laser heating. In the first image the laser heats the bilayer interface. The infrared laser shows as a faint dot in the center of the bilayer. The brighter spot near the bottom of the lower adhered droplet is a reflection of the visible beam used for alignment. In the second image the bilayer width has shrunk slightly. In the third image, the two droplets have coalesced. The scale bar is 100 microns.

Laser-Triggered Coalescence. We have demonstrated that laser heating can be used to rupture the lipid bilayer at will. This method of laser-induced droplet coalescence is shown in FIG. 8. Laser heating of the bilayer causes the bilayer to rupture and the two droplets to coalesce.

Figure 9:
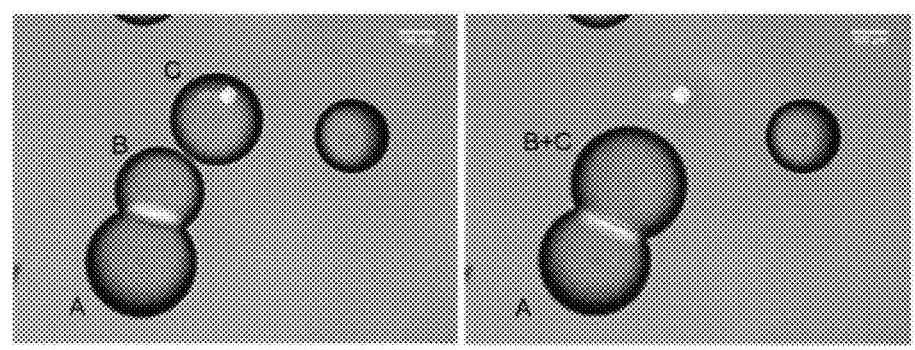
FIG. 9. Successive images demonstrating the fusion of drop C with drop B, which is part of a pair. Note the slight increase in the interfacial bilayer area upon fusion.

Aliquot Addition to One Side of Bilayer. The ability to introduce additional reagents into either side of the bilayer is a very powerful capability. We have been able to demonstrate this ability using the water-decanol system with 10:0 PG as the surface-active agent. In these preliminary studies, convective heating induced by the 1446 nm laser was used to move the drops. The results are shown in FIG. 9: A preformed droplet pair was selected and a third drop was fused with this system, resulting in complete mixing. The bilayer film from the primary pair remained intact, increasing in size slightly. We have demonstrated that illumination of the bilayer with the laser can rupture the bilayer (FIG. 8). Using this method in conjunction with the three-droplet technique in FIG. 9 allows us to perform rapid time-resolved studies, something not easily performed with existing techniques.

Figure 10:
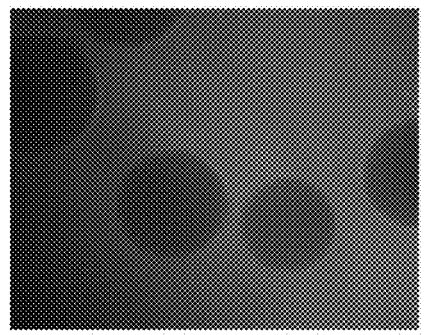
FIG. 10. Lipid monolayers labeled with fluorescent dye. Lipids are introduced in the solvent phase.

Long Lipids. To extend this methodology to form biologically relevant interfaces using lipids with 16 or more carbon atoms in their hydrophobic tails, we explored a variety of interfaces between phosphate buffer saline (150 mM, pH 7.4, PBS) drops in oil phases such as mineral oil, dodecane, and hexadecane. PBS drops were immersed in a 1 mM solution of DOPC in mineral oil. Drops with contact areas were observed with contact angles smaller than those noted with the decanol experiments mentioned above. An example of DOPC with NBD-PE, a fluorescently labeled lipid in dodecane, is shown in FIG. 10. Brighter fluorescence is seen around the periphery of the droplets and in the solvent.

Figure 11:
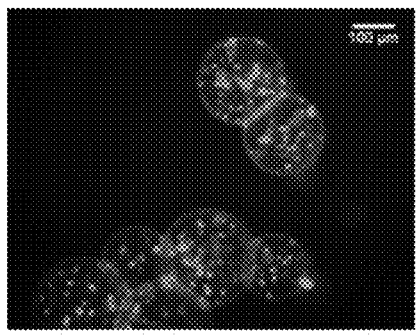
FIG. 11. Fluorescence image of DOPC (with 0.5% NBD-PE). Note fluorescence on bilayer, at hexadecane-water interface, and on remaining interior vesicles.

When the lipid was in the solvent phase, we were not able to move drops with the thermal Marangoni effect. While the contact area may be an important issue, evidence in the literature demonstrates that the presence of a surfactant in the continuous phase (here the mineral oil) can arrest the mobility induced by the Marangoni effect.[38] Thus we developed an alternative method to deliver lipids to the oil-water interface by introducing the lipids in a vesicle form in the water droplet. This approach is supported by observations that lipid vesicles would spontaneously rupture at such an interface and self-assemble to form a lipid monolayer.[9,39] Small unilamellar vesicles were formed via the sonication method.[40] A fluorescent lipid probe NBD-PE was also added to the vesicles to allow the interfaces to be seen. A water-in-hexadecane emulsion was prepared in a test tube via gentle vortexing. Several bilayer interfaces were observed in the resulting emulsion. One such set of interfaces is shown in FIG. 11. Some fluorescent vesicles are seen in the droplet interior as well. We were able to realize such interfaces with another lipid DphPC that has been routinely used to study emulsion based bilayer systems[3,19,20,22] and are shown in FIG. 12.

Exemplary Lipids:
  6:0 PC; 1,2-dihexanoyl-sn-glycero-3-phosphocholine
  10:0 PG; 1,2-didecanoyl-sn-glycero-3-[phospho-rac-(1-glycerol)]
  DphPC (4ME 16:0 PC); 1,2-diphytanoyl-sn-glycero-3-phosphocholine
  DOPC (18:1 PC); 1,2-dioleoyl-sn-glycero-3-phosphocholine NBD-PE; N-(7-nitrobenz-2-oxa-1,3-diazol-4-yl)-1,2-dihexadecanoyl-sn-glycero-3-phosphoethanolamine Ours is the first demonstration of creating an inverted emulsion bilayer using vesicles in the water phase. The results of this study have subsequently been published by the Bayley group[9] using physical micromanipulation of droplets. The method is readily extended to using different lipids in each droplet. In this manner, we can produce asymmetric bilayers, something not readily possible with existing artificial bilayer methods. While asymmetric bilayers can be produced using Langmuir Blodgett films on solid support or using vesicles[41] this is a time-consuming and difficult process.

Figure 12:
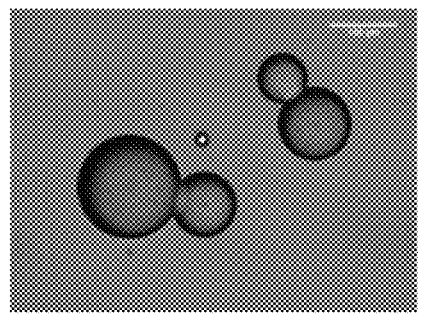
FIG. 12. Bright field images of emulsion bilayers formed with DphPC. Droplets were prepared as in FIG. 11.
Figure 13:
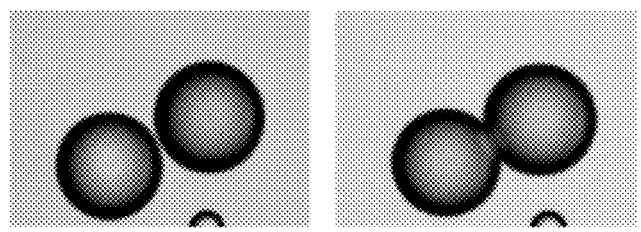
FIG. 13. DphPC vesicles in buffer result in the formation of lipid monolayers at the hexadecane-water interface. The resulting adhesion between droplets gives rise to bilayer interfaces. The interfaces were formed when the droplets were brought into contact via optical manipulation.

The bilayer systems of FIGS. 11 and 12 were formed by vortexing. We have also formed bilayers on demand using optical manipulation. Aqueous droplets were drawn with a syringe in a hexadecane reservoir based in a Petri dish. After allowing the lipid molecules about 30 minutes to migrate to the water-oil interface, an IR laser was used to heat up the edge of a water droplet. This resulted in convective currents being set up in the emulsion, drawing water droplets towards the heat source. If the optical manipulation is directed towards specific droplet pairs, it is possible to form the bilayer interface in the Petri dish as shown in FIG. 13. We have shown that interfaces formed using DphPC can be stable for up to 25 minutes.

Figure 14:
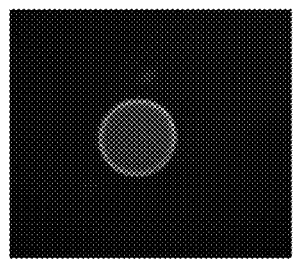
FIG. 14. Beta amyloid peptide present in the buffer droplet suspended in the hexadecane phase. The fluorescence is restricted to the interface and droplet interior, confirming that the peptide is confined to the buffer.
Figure 15:
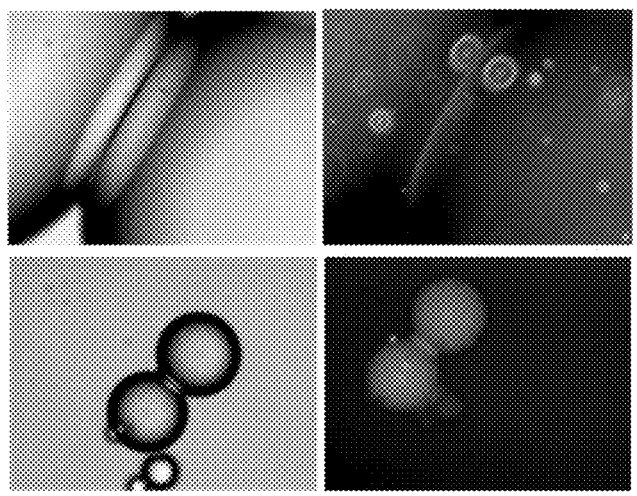
FIG. 15. Beta amyloid peptide present in the buffer droplet suspended in the hexadecane phase. Peptide is visible in the bilayer. The left column shows brightfield images and the right column shows fluorescence images. The top row corresponds to an interface made in the Petri dish and the bottom row corresponds to an interface made via vortexing the emulsion prior to imaging.

Introduction of Beta Amyloid Peptide. Having successfully demonstrated the formation of bilayer-like interfaces in emulsion-based systems, we demonstrated that a Beta amyloid peptide could insert itself effectively into the bilayer. We established that the peptide is localized to the water-hexadecane interface by introducing a FAM-labeled Beta amyloid peptide (42 mer, Anaspec) in buffer and presenting this aqueous solution in droplet form in the oil phase. FIG. 14 illustrates this result. We have also established that when the peptide is introduced in an aqueous solution of small unilamellar vesicles of DphPC, the resulting adhesive droplets have a fluorescent interface, as seen in FIG. 15. Note that there is no fluorescent lipid in this case, and hence the fluorescence observed is entirely from the peptide.

Optimize lipid emulsion system and create stable lipid bilayers upon droplet adhesion using optical manipulation techniques. Our preliminary work outlined above used a variety of solvents. In order to use the thermal Marangoni effect to move water droplets, a useful condition is to have a large contact angle between the water drop and the surface of the polystyrene Petri dish. The solvent eliminates droplet evaporation and serves to increase the contact angle, thereby decreasing the contact area with the surface of the solid substrate. The contact angle made between a drop and the surface of a solid substrate can be described by the interfacial surface tensions between the individual components.[42] Decanol was originally chosen based on data from the literature suggesting that it would yield a contact angle near 180° on hydrophobic surfaces with no lipid.[43] Work with lipids have different requirements on the host solvent.

Figure 16:
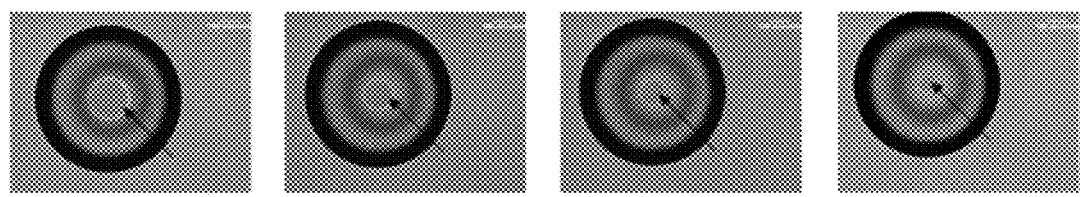
FIG. 16. Sequential images showing shrinking droplet contact area (indicated by arrow). Scale bar is 100 microns.

Non-polar solvents are our preferred host solvent. However, non-polar solvents seem to result in smaller contact angles of the water drops with the polystyrene Petri dish surface compared to decanol. We tried to generate drops with SDS aqueous solutions in a polystyrene Petri dish containing dodecane. The drops were observed to have a significant contact area, which reduced in size over time as shown in FIG. 16. We attributed this to the migration of SDS molecules to the water-dodecane interface that results in the release of the contact area between the water and polystyrene. When there is sufficient surfactant coverage at the water-dodecane interface, the water drop contact area releases and the drops levitate (i.e., there is zero contact area). When moving drops in non-polar solvents, the effect of convective heating is significantly reduced, given that dodecane has no —OH groups.

Host solvent. An important consideration in using emulsions to form lipid bilayers is the degree of solvent retention in the lipid bilayer film upon droplet adhesion. Any retained organic solvent in the lipid bilayer film would result in some change in the resulting bilayer structure and/or thickness.[44] Specifically, shorter alkanes (hexane, decane) will partition easily into the lipid bilayer interior and would be efficiently shielded from the lipid head groups interfacing with the water. However, with the longer alkanes such as hexadecane, partitioning of the alkane molecules into the lipid bilayer membrane is minimal[45] because the alkane chain length is comparable to the lipid, and hence the alkane molecules are forced to align with the lipid hydrophobic tails. This results in a loss of entropy for the alkane molecules, and long-chain alkane molecules would prefer the bulk oil phase.[45] Thus, hexadecane molecules will not be able to occupy a significant volume in a lipid bilayer since the order imposed by the lipid tails would force the hexadecane molecules into the bulk oil phase. Hexadecane and octadecane molecules have a chain length comparable to the chain length of physiological lipids. Replacing n-decane with n-octadecane reduces the volume fraction of solvent in the bilayer from 37% to 2%.[44] Mineral oil could offer another alternative. However, the exact composition of mineral oil is not known, and this might introduce reproducibility issues. Further, the addition of cholesterol will result in straightening the chains of the lipids making it more difficult for shorter alkane molecules to partition into the lipid bilayer.[44] Use of squalene reduces the solvent to immeasurable levels.[46,47] We compare hexadecane, octadecane, and squalene as host solvents with and without cholesterol to help exclude solvent from the bilayer. Since cholesterol is water soluble, it simplifies its introduction in the droplets. These comparisons extend into the studies of droplet mobility and bilayer thickness discussed below.

Another important factor that influences our ability to move the lipid-coated droplets is their combined interaction with the host solvent and the substrate of the sample holder. The water droplets have smaller contact angles when immersed in hexadecane in a polystyrene Petri dish compared to when decanol is the host solvent. Minimal contact areas of lipid-coated aqueous drops resulting from emulsions prepared in test tubes were observed when introduced into the Petri dish. On the other hand, when we used a 34-gauge syringe needle to draw drops of an aqueous lipid solution in hexadecane, the resulting drops retained their contact areas.

A low surface energy surface may be substituted for the polystyrene surface. We have used two methods previously to produce low surface energy surfaces. For the first method, Teflon sheet is used as the bottom surface of the chamber. The Teflon sheet is transparent and a self-adhesive Hybriwell chamber can be readily attached to contain the oil phase. A second method is coating of a glass surface with silane via solution self assembly of silane molecules.[48] This method can be performed on a glass Petri dish or on a microscope slide with a Hybriwell chamber. There is one additional method that will always work but has a little additional experimental complexity. We can use a thin layer of fluorinated oil[49] at the base of a Petri dish. Fluorinated oils have a higher density than water and would allow the water drops to float at the interface of the fluorinated and non-fluorinated oils. An additional layer of a non-fluorinated oil over the fluorinated oil serves to control evaporation. Because the droplet floats at the interface between the denser fluorinated oil and the less dense non-fluorinated oil, there is no contact surface and the droplets can always be moved.

Lipid delivery. Our approach of delivering lipid to the oil-water interface by introducing the lipids in vesicle form in the water droplets is original. Ideally, the concentration of the lipid vesicles in the water drops is adjusted so that there are just enough lipids to form a lipid monolayer. Using a fluorescent lipid probe such as NBD-PE, we are able to monitor the presence of lipid vesicles inside the water drops after a monolayer has formed at the oil-water interface. This method of lipid delivery has another advantage: It allows us to deliver transmembrane peptides into the water droplet at the same time we deliver the lipids. While there is a risk of the peptide partitioning at the oil-water interface as well, the mobility of the lipid and peptide at the oil-water interface generally allows the peptide to seek out the lipid bilayer. Another approach is to fuse a peptide-containing buffer drop with one of the two adhering drops that form the interfacial bilayer film, as shown in FIG. 9.

Optical manipulation of water droplets and investigation of the nature of the interfacial lipid film. We disclose alternative options to manipulate water droplets in the oil phase. One involves the thermal Marangoni effect. When lipid molecules in the dodecane phase migrate to the water-dodecane interface, they help reduce the contact area between the water drop and the polystyrene dish. The presence of the lipid in the host solvent might result in retardation of the thermal Marangoni effect due to a lipid-induced Marangoni stress.[38]

An alternative approach to manipulating the drops uses optical tweezers, which is unaffected by the lipid-induced Marangoni stress. Traditionally optical tweezers have been used to manipulate objects such as cells, polystyrene microspheres, and DNA molecules in an aqueous environment[50-52]. The refractive index of optically trapped objects is generally higher than that of the surrounding water. In our application, the system is reversed. We manipulate water drops in an oil medium where the refractive index of water is lower than that of the oil environment. In this situation, a tightly focused laser beam (1064 nm) repels water drops. This repulsive force is used to manipulate drop motion. Several examples in literature indicate the feasibility of this manipulation technique for inverted emulsions, including one from our laboratory.[25,49,53]

Lipid bilayer thickness estimation. Capacitance measurements by numerous groups in similar inverted emulsion systems[20,22,54] have shown than the thickness is that of a single bilayer. Theoretical and experimental work has shown that the amount of solvent in the bilayer can be reduced through proper choice of the solvent, with squalene producing negligible amounts of solvent in the bilayer.[46,47] Furthermore, cholesterol further reduces solvent in the bilayer.[44] At these immeasurably small concentrations of solvent using squalene or cholesterol, the presence of alkane solvents, which are chemically quite similar to lipid tails, should have less impact on the behavior of membrane channels than other factors such as the amount, type, and variety of lipids, amount of cholesterol, or density and type of surrounding transmembrane proteins.

Figure 17:
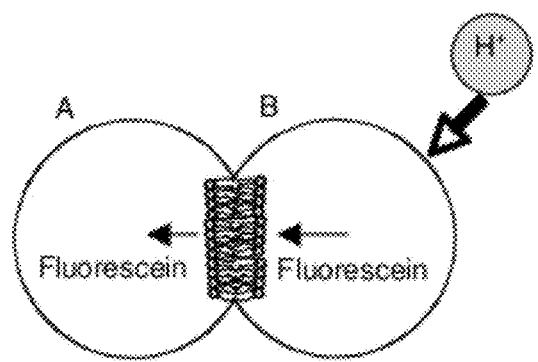
FIG. 17. Diagram of proton transport assay for characterizing bilayer.

Our experiments detail the nature and stability of the interface formed when two droplets adhere in the presence of lipid monolayers on each droplet. The interfacial film formed when the droplets adhere requires the thinning of the host liquid between the two monolayers.[54,55] To determine whether the resulting interface resembles an artificial bilayer, we characterize the thickness of the interfacial film. Interference of rays from the interfacial film results in the "black line" seen in an optical micrograph. However, this only implies that the film thickness is less than a quarter wavelength of the incident light.[54] Capacitance can be used for this purpose,[20,22,54] but this requires additional complexity associated with the electrical circuitry. We can also estimate the thickness of the lipid bilayer formed between two adhering droplets with a proton permeability assay as shown in FIG. 17. It is known that the permeability of protons through a lipid bilayer varies between $10^{-3}$ to $10^{-9}$ cm/s.[1,2,56-60] However, this variability arises due to the different types of lipids (saturated v/s unsaturated, charged v/s neutral head groups), the experimental system in the measurement (small v/s large unilamellar vesicles and planar bilayers), and the degree of pH gradients used.[1,60] We use liposomes as controls in our experiments. Specifically, it has been shown that the permeability of a lipid bilayer for protons varies with the thickness of the hydrocarbon region of the bilayer. Paula et al.[60] measured the permeability of lipid bilayers in vesicles to protons as a function of the number of carbon atoms in the hydrophobic tail of lipid bilayers formed by monounsaturated fatty acids with cis double bonds at the chain center. The experiments were performed in the fluid phase of the lipid bilayers. The lipid chain length was varied between C14 to C24. The proton permeability of the respective lipid bilayers varied from a value of $1.3 \times 10^{-2}$ cm/s for the shortest lipid (C14) and decreased to a value of $4.9 \times 10^{-5}$ cm/s for the longest lipid (C24). Thus, the proton permeability of the lipid bilayers decreased by a factor of 250 as the thickness of the hydrophobic region increased from 20 Å to 37 Å. This variation as a function of thickness has been shown to fit the pore transport model for the bilayers with shorter alkyl chains and the diffusion model for bilayers with carbon atoms in excess of 20. We reproduce the experiments performed by Paula et al. using the same lipids used in their study and compare these results with the permeability values obtained from measurements across the emulsion bilayer, again maintaining the same lipids.

The initial lipid preparation for the two studies is identical for both studies. The lipids are dissolved in chloroform and dried under a stream of nitrogen to evaporate the chloroform. The resulting lipid film is further dried under vacuum for two hours to remove residual chloroform. Rehydration of the lipid film is achieved by adding the same buffer as used in the studies by Paula et al[60] followed by a vigorous vortexing of the solution. The resulting aqueous lipid solution is allowed to equilibrate after which extrusion via 200 nm filters is performed to yield vesicles, which enclose the buffer as well as the pH sensitive dye. We use the same dye as was used in the study by Paula et al, i.e. Pyranine. It is water-soluble and is used as an optical reporter of fluorescence. These 200 nm-sized vesicles are used to study the change in pH via acid-base titration using a fluorimeter to reproduce measurements by Paula et al. All concentrations follow the protocols in that paper. Valinomycin is added to the liposome solution prior to fluorescence studies to dissipate any diffusion potential across the vesicle membrane due to potassium. Liposomes are characterized by dynamic light scattering to measure mean diameter.

For the droplet bilayer study we use 100 nm liposomes[9] with subsequent disruption on the oil-water interface. The pH for the droplet bilayer study is controlled through introduction of a tertiary droplet containing a dilute acid concentration (0.5 pH unit jumps) as shown in FIG. 17. Both drops use a buffer with constant buffer capacity over the pH range of interest and we build pH gradients as outlined in the liposome experiments, i.e. pH jumps of 0.5 units. We do not use potassium chloride in the buffer, and we do not use Valinomycin to dissipate any diffusion potential. Our method differs from the liposome study because we can provide identical volumes of identical ion concentrations to each side of the bilayer, which further prevents need for the Valinomycin. We ensure that we use a buffer with a constant buffer capacity over the pH range under study.

Scaling arguments[60] show that the exact H+ concentration does not affect the measurement. The fluorescence intensity of the dye in drop B decreases rapidly as the $H^+$ ions diffuse into the volume of drop B. Once the $H^+$ ions begin permeating through the bilayer membrane into drop A, the fluorescence intensity of the dye in this drop begins to decrease while that in drop B begins to increase. The bilayer area is determined by measurements of the bilayer diameter. The bilayer is almost a perfect circle because of the symmetry involved when two spherical droplets adhere to form the bilayer. Although there is a slight deformation at the bottom of each droplet (see FIG. 5), this is well removed from the bilayer, which forms on the side of the droplet. We estimate that we can determine the bilayer area to 2% accuracy. Using the area of the lipid bilayer and the fluorescence decrease in drop A as the $H^+$ ions permeate through the bilayer, we calculate the permeability of the lipid bilayer and hence estimate the thickness of the lipid hydrocarbon region. By varying the lipid chain length we can also determine if we see noticeable changes in the bilayer permeability. Using the proton permeability given by Paula et al.,[60] we calculate that the fluorescence signal for a pair of 100-micron-radius droplets with 16 to 18 carbon tail lipids will change over a time scale of 20 seconds irrespective of the initial pH. We can measure changes on this time scale quite easily with our fluorescence microscope.

We have observed bilayer stability over periods of around a half hour; much longer stabilities are possible with this system if we monitor the bilayer longer. Poulin and Bibette[23] have investigated the formation of adhesive films between water drops stabilized by egg lecithin in water-in-oil emulsions. A mixture of solvents was used for the oil phase. Lipids were soluble in one solvent (ether) and insoluble in the other (silicone oil). The authors report increased adhesion energy between the lipid monolayers when the concentration of silicone oil was increased. We can adopt this methodology if necessary to increase the stability of lipid bilayers formed between adhering water droplets.

Figure 18:
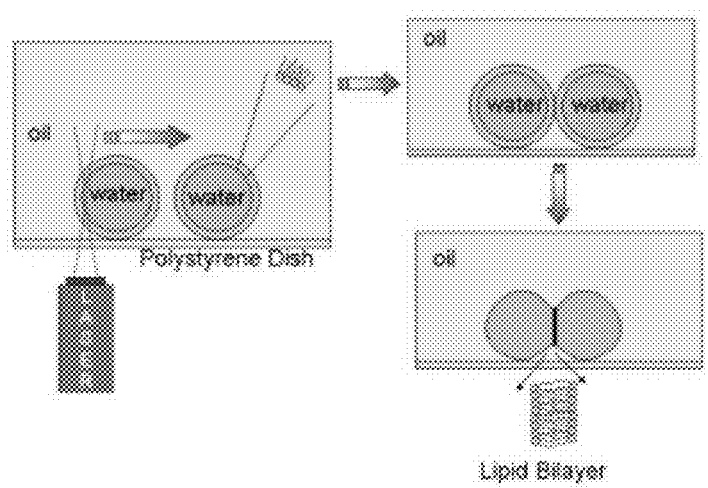
FIG. 18. Schematic of adhesive bilayer formed with inverted emulsions.

Incorporate transmembrane proteins into the droplet-based bilayer and test their presence. Our inverted emulsion assay (FIG. 18) tests the performance of the artificial membrane using one transmembrane protein and one self-assembled pore with a transmembrane peptide. The lipid is introduced in the water phase. Two droplets are prepared using the microdroplet generator. One or both drops contain the transmembrane proteins, and an indicator fluorescent molecule is used to test transport across the membrane protein pore. The lipid in the water phase self-assembles to form a monolayer on each droplet. The laser tweezer beam is used to bring the two droplets into close proximity, forming the artificial membrane. Upon lipid bilayer formation, the protein inserts into the bilayer and the location of the fluorescent intensity of the indicator molecule is monitored. If a functional pore is formed in the interfacial lipid bilayer, the indicator molecule is transported from one drop to the other; or if pH is monitored for ion transport across the pore, the intensity of the indicator dye increases in the direction of ion flow. Control experiments are performed with no transmembrane protein or using an indicator molecule which cannot be transported through the pore.

Figure 19:
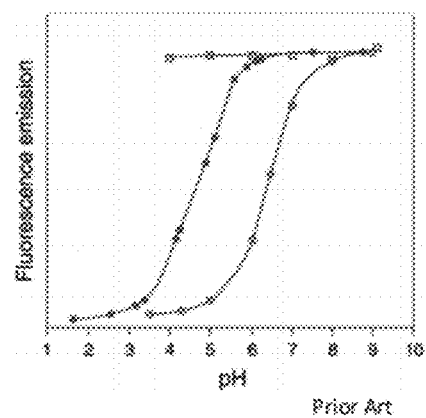
FIG. 19. Fluorescence emission from some fluorescent dyes. Comparison of pH-dependent fluorescence of the Oregon Green 488, carboxyfluorescein and Alexa Fluor 488 fluorophores. Fluorescence intensities were measured for equal concentrations of the three dyes using excitation/emission at 490/520 nm.

Our first test protein is α-Hemolysin (Sigma), a bacterial protein from *Staphylococcus aureus* that forms conducting pores in a cell membrane. The protein monomers bind to form a heptamer that forms a water-filled cavity 1.4 nm in diameter.[61] The protein is added to one of the two aqueous drops brought into contact to form and to reconstitute into the bilayer. Upon insertion, a pore is formed in the bilayers. The pore size allows small ions and dye-labeled nucleotides to pass through the pore. The second drop in the adhering pair houses fluorescein-labeled nucleotides.[62] If the protein is reconstituted the pore allows the passage of the nucleotides from one drop to the other. This is a diffusion-limited process. As a control, we employ a rhodamine-labeled protein to test for pore permeability. The bulky protein remains in its original environment.[62] We can also test the presence of the membrane pore by using a pH-sensitive dye such as fluorescein[63] (see FIG. 19). If the pH is acidic in one of the two drops, then hydrogen ions migrate across the pore to equilibrate the pH. If fluorescein is tagged to a microsphere (Invitrogen) large enough not to pass through the α-Hemolysin pore, a change in pH results in a fluorescence intensity change from the aqueous compartment containing the indicator fluorescein. We can also use calcium transport and an indicator dye to monitor the pore transport.[64]

The assay described above can be directly extended to high-throughput experiments. This is of particular interest in the study of drug-protein interactions. The drug under test can be encapsulated in one of the two adhering droplets, and its effect on the reconstituted protein can be optically tested via a fluorescence indicator molecule. We use a Nikon TE2000-E inverted fluorescence microscope with a motorized stage, and have used a piezoelectric droplet generator (Microfab Technologies) to produce water droplets in oil on demand. With the motorized stage and on-demand droplet generation we can deposit thousands of droplets in a conventional 25 mm Petri dish. Assays can then be performed sequentially, with the stage moving each set of droplets into the microscope field of view (FIG. 20). With regularly spaced droplets, automated laser control using a galvo-mirror pair brings the droplets together to form the two pairs of artificial membranes. The assay results are measured using the fluorescence microscope camera. The stage then brings the next set of droplets into view.

Figure 21:
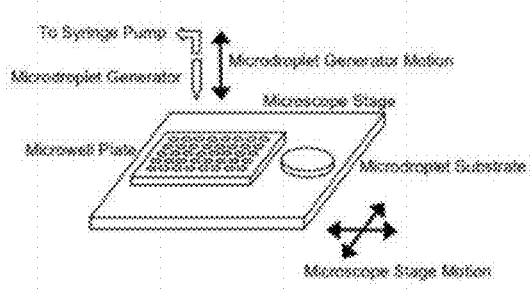
FIG. 21. Schematic of apparatus for high-throughput assay using motorized microscope stage on inverted microscope.

The α-Hemolysin assay is reproduced in the high-throughput manner to demonstrate this capability with a minimum of 100 assays on one substrate. FIG. 21 shows the method for this high-throughput study. Automation is provided by the combination of the motorized microscope stage and a piezo-based droplet dispenser on a motorized vertical stage. A syringe pump is connected to the droplet generator. The droplet dispenser is similar to a pipette tip with a piezoelectric transducer. When the piezo is pulsed, a single droplet is generated. With operation of the syringe pump, the droplet generator can be filled with regents, excess emptied into waste, or cleaning solution used for rinsing. Both a 96-well microplate and the bilayer substrate are placed on the motorized stage. Preparation of a droplet array such as shown in FIG. 20 proceeds as follows. Under computer control, the microscope stage is moved to put a selected well of the microplate under the droplet generator. The vertical stage lowers the droplet generator, the syringe pump aspirates an aliquot from the well, and the vertical stage is raised again. The microscope stage moves the bilayer substrate under the droplet generator, the vertical stage lowers the droplet generator, and one or more droplets are generated on the substrate. The repeatability of our microscope stage is 1 μm. The droplet generator is raised and the microplate is moved under the droplet generator, where similar steps are performed to eject the excess reagent into a waste well and rinse the tip in a rinse well. We perform the demonstration experiment with 5 different concentrations of α-Hemolysin, 5 different concentrations of fluorescein-labeled nucleotides, and 4 replicates of each, for a total of 100 assays. Dilutions are performed using the syringe pump and droplet generator into empty wells. Adaptation of our methods by others will not be difficult, as illustrated in FIG. 21. If an inverted microscope with a motorized stage is available, it can be converted to a high-throughput artificial bilayer assay system by adding an infrared laser, a syringe pump, and microdroplet generator on a motorized vertical stage.

Figure 22:
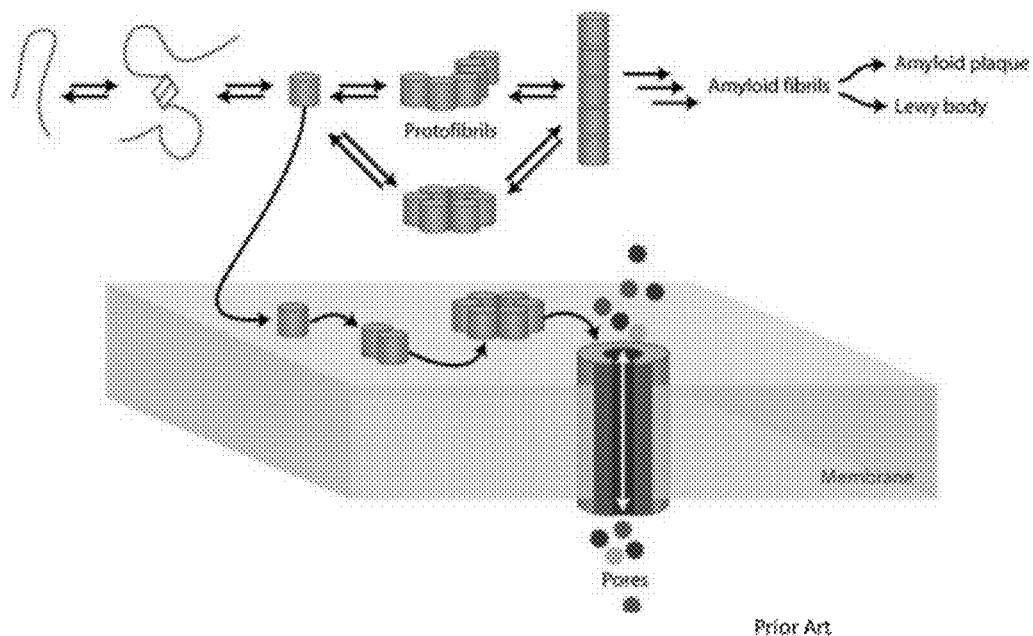
FIG. 22. Pore formation by amyloid-forming proteins may occur by one of several mechanisms similar to those used by evolved pore-forming protein toxin (PFT). Image from H. A. Lashuel, Sci. Aging Knowl. Environ. 2005, pe28 (2005).

Pore formation via amyloid beta peptides. The application of this technique to study peptide assembly can be demonstrated with beta amyloid peptides, which have long been implicated in Alzheimer's disease and type II diabetes. These peptides self-assemble in the lipid bilayer to form pores that conduct ions from the extracellular environment into the cell. A schematic of the mechanism is shown in FIG. 22.

Figure 23:
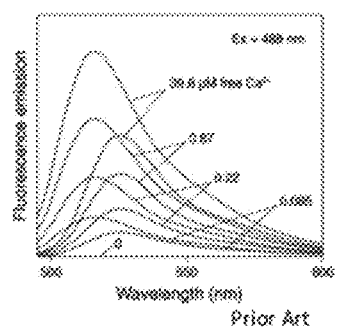
FIG. 23. Fluorescence emission spectra at equal concentrations of fluo-4 (blue) and fluo-3 (red) in solutions containing 0-39.8 µM free Ca2+. Data from Invitrogen, of Life Technologies, Carlsbad, Calif.

The 40 or 42 residue amyloid beta peptide[65-71] is used in the proposed experiment where the peptide will be introduced in the aqueous phase with the lipids. Upon bilayer formation, the peptide inserts into the lipid bilayer, and when several peptides in the bilayer self-assemble to form a pore, we can to measure the transport of calcium ions using a calcium-ion-sensitive fluorescent dye such as Fluo 4 from Invitrogen (see FIG. 23). Again, here the detection methodology is similar to that used to study alpha hemolysin insertion and function in the lipid bilayer.

Figure 24:
FIG. 24. Schematic of three-droplet kinetic assay. Free third droplet (top) is adhered to one of the larger droplets in a two-droplet pair (middle). Laser-induced coalescence introduces contents of third droplet into larger droplet.

We can also observe kinetic changes in the function of the transmembrane proteins such as the time required to transport molecules under different conditions. The droplet method works well for kinetic studies such as shown in FIG. 7. In an alternative embodiment, we can assemble the bilayer and transmembrane proteins first and then add the fluorescently labeled molecules using laser-induced droplet coalescence. The fluorescently labeled molecules are introduced using the laser rupture of a third droplet based on the methods demonstrated in FIGS. 8 and 9. This method can be used for kinetic studies as follows. We can prepare a complete two-droplet bilayer with the transmembrane proteins in place, and then adhere a third smaller droplet containing the labeled molecules to one of the pair of droplets (FIG. 24). The laser is then be used to rupture the bilayer on the smaller droplet, releasing the contents into the neighboring large droplet. This creates a well-defined starting point for kinetic studies. The use of a third droplet also allows observation of mobility of transmembrane proteins. If the third droplet is not ruptured, the labeled contents of the third droplet are transported into its neighboring droplet only if some transmembrane proteins have migrated from the initial bilayer to the new bilayer on the small droplet.

LITERATURE CITED

1. D. W. Deamer and J. W. Nichols, "Proton-hydroxide permeability of liposomes," Proc Natl Acad Sci USA. 80, 165-168. (1983).
2. J. Gutknecht, "Proton/hydroxide conductance and permeability through phospholipid bilayer membranes," Proc Natl Acad Sci USA. 84, 6443-6446. (1987).
3. M. A. Holden, D. Needham, and H. Bayley, "Functional bionetworks from nanoliter water droplets," J Am Chem Soc. 129, 8650-8655. Epub 2007 June 8616. (2007).
4. B. L. Kagan, R. Azimov, and R. Azimova, "Amyloid peptide channels," J Membr Biol. 202, 1-10. (2004).
5. H. Suzuki and S. Takeuchi, "Microtechnologies for membrane protein studies," Anal Bioanal Chem 12, 12 (2008).
6. Y. Pi, M. J. Goldenthal, and J. Marin-Garcia, "Mitochondrial channelopathies in aging," J Mol Med. 85, 937-951. Epub 2007 April 2011. (2007).
7. M. A. Cooper, "Advances in membrane receptor screening and analysis," J. Mol. Recognit. 17, 286-315 (2004).
8. J. Drews, "Drug discovery: A historical perspective," Science 287, 1960-1964 (2000).
9. W. L. Hwang, M. Chen, B. Cronin, M. A. Holden, and H. Bayley, "Asymmetric droplet interface bilayers," J Am Chem Soc. 130, 5878-5879. Epub 2008 March 5826. (2008).
10. W. Zheng, R. H. Spencer, and L. Kiss, "High throughput assay technologies for ion channel drug discovery," Assay Drug Devel. Technol. 2, 543-552 (2004).
11. L. McKeown, P. Robinson, and O. T. Jones, "Molecular basis of inherited calcium channelopathies: role of mutations in pore-forming subunits," Acta Pharmacol Sin. 27, 799-812. (2006).
12. R. Felix, "Calcium channelopathies," Neuromolecular Med 8, 307-318 (2006).
13. M. G. Hanna, "Genetic neurological channelopathies," Nat Clin Pract Neurol. 2, 252-263. (2006).
14. R. Lal, H. Lin, and A. P. Quist, "Amyloid beta ion channel: 3D structure and relevance to amyloid channel paradigm," Biochim Biophys Acta. 1768, 1966-1975. Epub 2007 May 1963. (2007).
15. A. Bruggemann, S. Stoelzle, M. George, J. C. Behrends, and N. Fertig, "Microchip technology for automated and parallel patch-clamp recording," Small 2, 840-846 (2006).
16. H. Suzuki, K. Tabata, Y. Kato-Yamada, H. Noji, and S. Takeuchi, "Planar lipid bilayer reconstitution with a microfluidic system," Lab Chip 4, 502-505 (2004).
17. A. Janshoff and C. Steinem, "Transport across artificial membranes—an analytical perspective," Anal Bioanal Chem. 385, 433-451. Epub 2006 April 2006. (2006).
18. E. T. Castellana and P. S. Cremer, "Solid supported lipid bilayers: From biophysical studies to sensor design," Surf. Sci. Rep. 61, 429-444 (2006).
19. A. J. Heron, J. R. Thompson, A. E. Mason, and M. I. Wallace, "Direct detection of membrane channels from gels using water-in-oil droplet bilayers," J Am Chem Soc. 129, 16042-16047. Epub 12007 December 16041. (2007).
20. K. Funakoshi, H. Suzuki, and S. Takeuchi, "Lipid bilayer formation by contacting monolayers in a microfluidic device for membrane protein analysis," Anal. Chem. 78, 8169-8174 (2006).
21. J. R. Thompson, A. J. Heron, Y. Santoso, and M. I. Wallace, "Enhanced stability and fluidity in droplet on hydrogel bilayers for measuring membrane protein diffusion," Nano Lett. 7, 3875-3878. Epub 2007 November 3873. (2007).
22. N. Malmstadt, M. A. Nash, R. F. Purnell, and J. J. Schmidt, "Automated formation of lipid-bilayer membranes in a microfluidic device," Nano Lett. 6, 1961-1965 (2006).
23. P. Poulin and J. Bibette, "Adhesion of water droplets in organic solvent," Langmuir 14, 6341-6343 (1998).
24. J. Bibette, F. L. Calderon, and P. Poulin, "Emulsions: basic principles," Rep. Prog. Phys. 62, 969-1033 (1999).
25. K. T. Kotz, K. A. Noble, and G. W. Faris, "Optical microfluidics," Appl. Phys. Lett. 85, 2658-2660 (2004).
26. K. T. Kotz, Y. Gu, and G. W. Faris, "Optically addressed droplet-based protein assay," J. Am. Chem. Soc. 127, 5736-5737 (2005).
27. J. Bibette, T. G. Mason, G. Hu, D. A. Weitz, and P. Poulin, "Structure Of Adhesive Emulsions," Langmuir 9, 3352-3356 (1993).

28. M. Hase, A. Yamada, T. Hamada, and K. Yoshikawa, "Transport of a cell-sized phospholipid micro-container across water/oil interface," Chem. Phys. Lett. 426, 441-444 (2006).

29. M. Y. He, J. S. Edgar, G. D. M. Jeffries, R. M. Lorenz, J. P. Shelby, and D. T. Chiu, "Selective encapsulation of single cells and subcellular organelles into picoliter- and femtoliter-volume droplets," Anal. Chem. 77, 1539-1544 (2005).

30. M. He, C. Sun, and D. T. Chiu, "Concentrating solutes and nanoparticles within individual aqueous microdroplets," Anal. Chem. 76, 1222-1227 (2004).

31. A. Yamada, T. Yamanaka, T. Hamada, M. Hase, K. Yoshikawa, and D. Baigl, "Spontaneous transfer of phospholipid-coated oil-in-oil and water-in-oil micro-droplets through an oil/water interface," Langmuir 22, 9824-9828 (2006).

32. R. W. Davis, A. Flores, T. A. Barrick, J. M. Cox, S. M. Brozik, G. P. Lopez, and J. A. Brozik, "Nanoporous microbead supported bilayers: Stability, physical characterization, and incorporation of functional transmembrane proteins," Langmuir 23, 3864-3872 (2007).

33. A. Deniaud, C. Rossi, A. Berquand, J. Homand, S. Campagna, W. Knoll, C. Brenner, and J. Chopineau, "Voltage-dependent anion channel transports calcium ions through biomimetic membranes," Langmuir 23, 3898-3905 (2007).

34. A. Simon, A. Girard-Egrot, F. Sauter, C. Pudda, N. P. D'Hahan, L. Blum, F. Chatelain, and A. Fuchs, "Formation and stability of a suspended biomimetic lipid bilayer on silicon submicrometer-sized pores," J. Colloid Interface Sci. 308, 337-343 (2007).

35. A. N. Parikh and J. T. Groves, "Materials science of supported lipid membranes," MRS Bull. 31, 507-512 (2006).

36. B. Schuster and U. B. Sleytr, "Biomimetic S-layer supported lipid membranes," Curr. Nanosci. 2, 143-152 (2006).

37. A. M. Brozell, M. A. Muha, B. Sanii, and A. N. Parikh, "A class of supported membranes: Formation of fluid phospholipid bilayers on photonic band gap colloidal crystals," J. Am. Chem. Soc. 128, 62-63 (2006).

38. J. N. Chen and K. J. Stebe, "Surfactant-induced retardation of the thermocapillary migration of a droplet," J. Fluid Mech. 340, 35-59 (1997).

39. R. A. Walker, J. C. Conboy, and G. L. Richmond, "Molecular structure and ordering of phospholipids at a liquid-liquid interface," Langmuir 13, 3070-3073 (1997).

40. W. H. Pitcher, 3rd and W. H. Huestis, "Preparation and analysis of small unilamellar phospholipid vesicles of a uniform size," Biochem Biophys Res Commun. 296, 1352-1355. (2002).

41. S. Pautot, B. J. Frisken, and D. A. Weitz, "Engineering asymmetric vesicles," Proc Natl Acad Sci USA. 100, 10718-10721. Epub 12003 September 10718. (2003).

42. M. Kappl, K. Graf, and H.-J.Butt, *Physics and Chemistry of Interfaces* (Wiley-VCH, 2003).

43. B. P. Binks and J. H. Clint, "Solid wettability from surface energy components: Relevance to Pickering emulsions," Langmuir 18, 1270-1273 (2002).

44. R. Fettiplace and D. A. Haydon, "Water permeability of lipid membranes," Physiol. Rev. 60, 510-550 (1980).

45. D. W. Gruen and D. A. Haydon, "A mean-field model of the alkane-saturated lipid bilayer above its phase transition. II. Results and comparison with experiment," Biophys J. 33, 167-187. (1981).

46. S. H. White, "Formation of "solvent-free" black lipid bilayer membranes from glyceryl monooleate dispersed in squalene," Biophys. J. 23, 337-347 (1978).

47. S. A. Simon, L. J. Lis, R. C. MacDonald, and J. W. Kauffman, "The noneffect of a large linear hydrocarbon, squalene, on the phosphatidylcholine packing structure," Biophys. J. 19, 83-90 (1977).

48. S. S. Dixit, A. Szmodis, and A. N. Parikh, "Glass bead probes of local structural and mechanical properties of fluid, supported membranes," Chemphyschem. 7, 1678-1681. (2006).

49. J. E. Reiner, A. M. Crawford, R. B. Kishore, L. S. Goldner, K. Helmerson, and M. K. Gilson, "Optically trapped aqueous droplets for single molecule studies," Appl. Phys. Lett. 89, 013904 (2006).

50. D. G. Grier, "A revolution in optical manipulation," Nature 424, 810-816 (2003).

51. B. Brower-Toland and M. D. Wang, "Use of optical trapping techniques to study single-nucleosome dynamics," in *Chromatin And Chromatin Remodeling Enzymes, Pt B* (2004), Vol. 376, pp. 62-72.

52. S. Kulin, R. Kishore, K. Helmerson, and L. Locascio, "Optical manipulation and fusion of liposomes as microreactors," Langmuir 19, 8206-8210 (2003).

53. M. Hase, A. Yamada, T. Hamada, D. Baigl, and K. Yoshikawa, "Manipulation of cell-sized phospholipid-coated microdroplets and their use as biochemical microreactors," Langmuir 23, 348-352 (2007).

54. H. Fujiwara, M. Fujihara, and T. Ishiwata, "Dynamics of the spontaneous formation of a planar phospholipid bilayer: A new approach by simultaneous electrical and optical measurements," J. Chem. Phys. 119, 6768-6775 (2003).

55. J. Sjoblom, *Encyclopedic Handbook of Emulsion Technology* (Marcel Dekker, 2001).

56. J. W. Nichols and D. W. Deamer, "Net proton-hydroxyl permeability of large unilamellar liposomes measured by an acid-base titration technique," Proc Natl Acad Sci USA. 77, 2038-2042. (1980).

57. J. W. Nichols, M. W. Hill, A. D. Bangham, and D. W. Deamer, "Measurement of net proton-hydroxyl permeability of large unilamellar liposomes with the fluorescent pH probe, 9-aminoacridine," Biochim Biophys Acta. 596, 393-403. (1980).

58. Y. Nozaki and C. Tanford, "Proton and hydroxide ion permeability of phospholipid vesicles," Proc Natl Acad Sci USA. 78, 4324-4328. (1981).

59. D. W. Deamer and J. W. Nichols, "Proton flux mechanisms in model and biological membranes," J Membr Biol. 107, 91-103. (1989).

60. S. Paula, A. G. Volkov, A. N. Van Hoek, T. H. Haines, and D. W. Deamer, "Permeation of protons, potassium ions, and small polar molecules through phospholipid bilayers as a function of membrane thickness," Biophys. J. 70, 339-348 (1996).

61. L. Z. Song, M. R. Hobaugh, C. Shustak, S. Cheley, H. Bayley, and J. E. Gouaux, "Structure of *staphylococcal* alpha-hemolysin, a heptameric transmembrane pore," Science 274, 1859-1866 (1996).

62. V. Noireaux and A. Libchaber, "A vesicle bioreactor as a step toward an artificial cell assembly," Proc. Natl. Acad. Sci. U.S.A. 101, 17669-17674 (2004).

63. R. Sjoback, J. Nygren, and M. Kubista, "Absorption And Fluorescence Properties Of Fluorescein," Spectroc. Acta Pt. A-Molec. Biomolec. Spectr. 51, L7-L21 (1995).

64. R. Hemmler, G. Bose, R. Wagner, and R. Peters, "Nanopore unitary permeability measured by electrochemical and optical single transporter recording," Biophys. J. 88, 4000-4007 (2005).

65. J. M. Alarcon, J. A. Brito, T. Hermosilla, I. Atwater, D. Mears, and E. Rojas, "Ion channel formation by Alzheimer's disease amyloid beta-peptide (A beta 40) in unilamellar liposomes is determined by anionic phospholipids," Peptides 27, 95-104 (2006).

66. E. E. Ambroggio, D. H. Kim, F. Separovic, C. J. Barrow, C. J. Barrow, K. J. Bamham, L. A. Bagatolli, and G. D. Fidelio, "Surface behavior and lipid interaction of Alzheimer beta-amyloid peptide 1-42: A membrane-disrupting peptide," Biophys. J. 88, 2706-2713 (2005).

67. M. Bokvist, F. Lindstrom, A. Watts, and G. Grobner, "Two types of Alzheimer's beta-amyloid (1-40) peptide membrane interactions: Aggregation preventing transmembrane anchoring Versus accelerated surface fibril formation," J. Mol. Biol. 335, 1039-1049 (2004).

68. S. R. Ji, Y. Wu, and S. F. Sui, "Cholesterol is an important factor affecting the membrane insertion of beta-amyloid peptide (A beta 1-40), which may potentially inhibit the fibril formation," J. Biol. Chem. 277, 6273-6279 (2002).

69. H. Lin, R. Bhatia, and R. Lal, "Amyloid beta protein forms ion channels: implications for Alzheimer's disease pathophysiology," FASEB J. 15, 2433-2444 (2001).

70. S. Micelli, D. Meleleo, V. Picciarelli, and E. Gallucci, "Effect of sterols on beta-amyloid peptide (A beta P 1-40) channel formation and their properties in planar lipid membranes," Biophys. J. 86, 2231-2237 (2004).

71. S. K. Rhee, A. P. Quist, and R. Lal, "Amyloid beta protein-(1-42) forms calcium-permeable, Zn2+-sensitive channel," J. Biol. Chem. 273, 13379-13382 (1998).

The descriptions of particular embodiments and examples are offered by way of illustration and not by way of limitation. All publications and patent applications cited in this specification and all references cited therein are herein incorporated by reference as if each individual publication or patent application or reference were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of making an amphiphilic bilayer using aqueous micro-droplets in a water-immiscible solvent, wherein immediately surrounding each droplet is a monolayer of amphiphiles, comprising:
juxtapositioning the droplets with a focused laser beam such that the monolayers merge to create a bilayer of the amphiphiles between the droplets.

2. The method of claim 1, wherein the droplets are restrained in two dimensions by one or more solid surfaces or density-differential interfaces.

3. The method of claim 1, wherein the laser beam juxtaposes the droplets by localized heating or by refractive index mismatch.

4. The method of claim 1, wherein the solvent is mineral oil, hexadecane, squalene, decane, dodecane, or decanol.

5. The method of claim 1, wherein the amphiphiles are phospholipids, surfactants, or physiological lipids.

6. The method of claim 1 wherein the droplets are arrayed on a surface that is polystyrene, other plastic surface, fluorinated oil, or a silanized surface.

7. The method of claim 1 further comprising the antecedent step of arraying the droplets on a surface by contact printing, ink-jet type printing or microextrusion.

8. The method of claim 1 wherein the amphiphile is a physiological lipid.

9. The method of claim 1 wherein the amphiphile is physiological lipid that is 1,2-dihexanoyl-sn-glycero-3-phosphocholine (PC), 1,2-didecanoyl-sn-glycero-3-[phospho-rac-(1-glycerol)] (PG), 1,2-diphytanoyl-sn-glycero-3-phosphocholine (DphPC), 1,2-dioleoyl-sn-glycero-3-phosphocholine (DOPC), or N-(7-nitrobenz-2-oxa-1,3-diazol-4-yl)-1,2-dihexadecanoyl-sn-glycero-3-phosphoethanolamine (NBD-PE)

10. The method of claim 1 wherein the amphiphile is a physiological lipid that is 1,2-diphytanoyl-sn-glycero-3-phosphocholine (DPhPC).

11. The method of claim 1 wherein the solvent is mineral oil and the amphiphile is a physiological lipid.

12. The method of claim 1 wherein the solvent is mineral oil and the amphiphile is a physiological lipid that is 1,2-dihexanoyl-sn-glycero-3-phosphocholine (PC), 1,2-didecanoyl-sn-glycero-3-[phospho-rac-(1-glycerol)] (PG), 1,2-diphytanoyl-sn-glycero-3-phosphocholine (DphPC), 1,2-dioleoyl-sn-glycero-3-phosphocholine (DOPC), or N-(7-nitrobenz-2-oxa-1,3-diazol-4-yl)-1,2-dihexadecanoyl-sn-glycero-3-phosphoethanolamine (NBD-PE).

13. The method of claim 1 wherein the solvent is mineral oil and the amphiphile is a physiological lipid that is 1,2-diphytanoyl-sn-glycero-3-phosphocholine (DPhPC).

14. The method of claim 1 wherein the solvent is decanol and the amphiphile is a surfactant.

15. The method of claim 1 wherein the solvent is hexadecane and the amphiphile is 1,2-diphytanoyl-sn-glycero-3-phosphocholine (DPhPC).

16. The method of claim 1 wherein one of the droplets contains a protein or peptide that inserts into the bilayer.

17. The method of claim 1 wherein one of the droplets contains a protein or peptide that inserts into the bilayer, forming a transmembrane protein or peptide, and the method further comprises detecting function of the transmembrane protein or peptide.

18. The method of claim 1 wherein one of the droplets contains a protein or peptide that inserts into the bilayer, forming a transmembrane protein or peptide which forms a pore, and the method further comprises detecting function of the transmembrane protein or peptide by detecting transport through the pore.

19. The method of claim 1 wherein one of the droplets contains a protein or peptide that inserts into the bilayer, forming a transmembrane protein or peptide, and the method further comprises detecting function of the transmembrane protein or peptide, wherein one of the droplets contains a drug which affects the transmembrane proteins.

20. The method of claim 1 wherein one of the droplets contains a protein or peptide that inserts into the bilayer, forming a transmembrane protein or peptide, and the method further comprises detecting function of the transmembrane protein or peptide in a high-throughput screening format.

* * * * *